Nov. 7, 1950  P. A. SHERWOOD  2,529,052
PHOTOGRAPHIC SLIDE VIEWER AND PROJECTOR
Filed Nov. 28, 1947
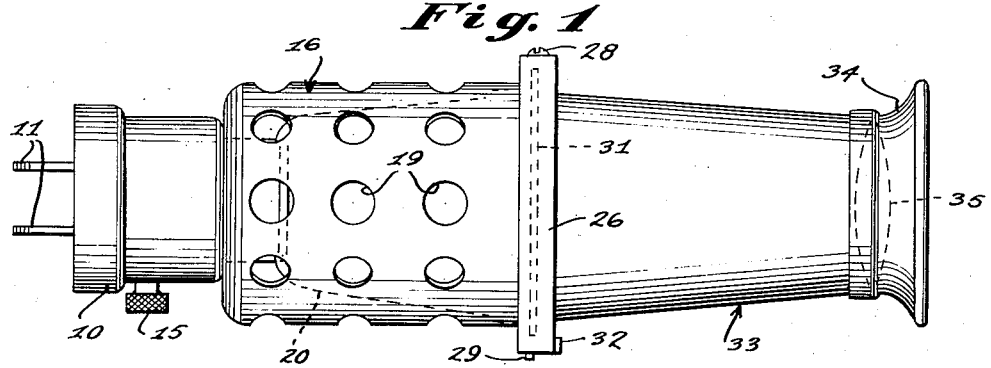
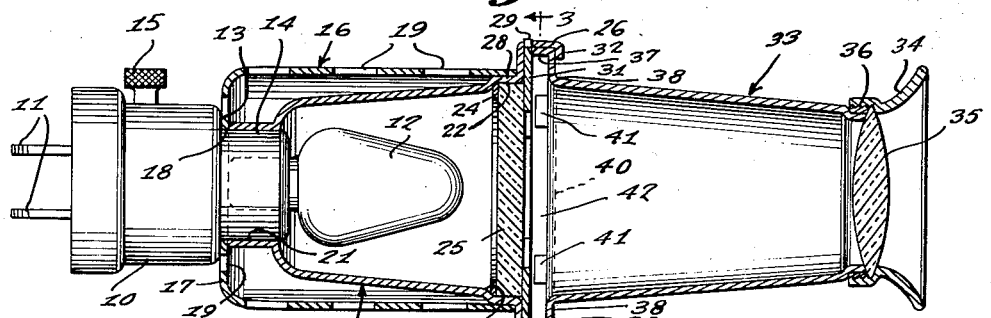
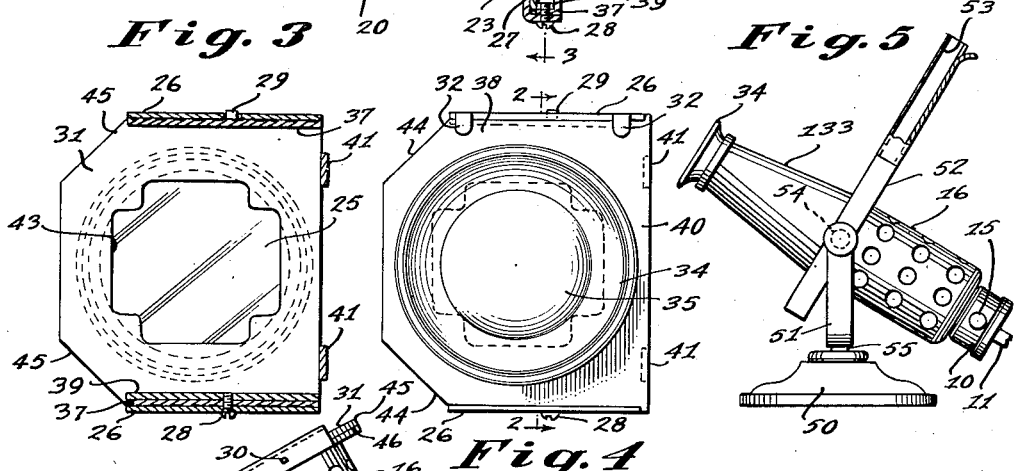
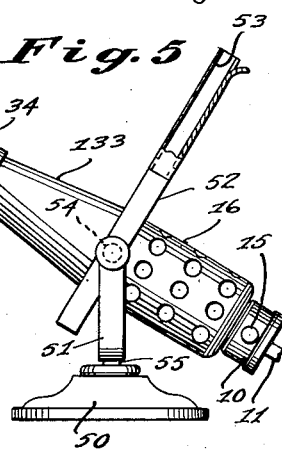
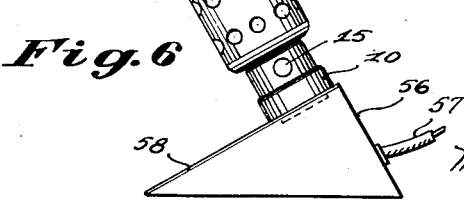
INVENTOR.
PERLEY A. SHERWOOD
BY
McMorrow, Berman + Davidson
ATTORNEYS Patented Nov. 7, 1950

2,529,052

UNITED STATES PATENT OFFICE 2,529,052

PHOTOGRAPHIC SLIDE VIEWER AND PROJECTOR

Perley A. Sherwood, Camden, N. J.

Application November 28, 1947, Serial No. 788,472

5 Claims. (Cl. 40—130)

My invention relates to photographic slide viewers and projectors, and more particularly to such devices as are adapted to illuminate and/or enlarge a photographic slide for viewing the same either directly or as projected on a screen.

With the foregoing in view, an object of my invention is to provide an improved photographic slide viewer and projector.

A further object is to provide an improved photographic slide viewer which includes means for viewing an enlarged and illuminated photographic slide interposed between the viewer and the light source, as well as means for projecting a view of said slide onto a screen.

A further object is to provide an improved photographic slide viewer and projector which is small in size, light in weight, which is capable of being readily constructed by one skilled in the art at a low cost, and which is strong and sturdy in use.

A further object is to provide an improved photographic slide viewer and projector which comprises a novel assembly of demountable parts whereby broken or worn parts may be readily removed and replaced.

A further object is to provide an improved photographic slide viewer and projector which includes means for mounting the same on any of a plurality of bases and/or means adapting the viewer to standard slide-viewing equipment.

Other objects and advantages reside in the particular structure of the invention, and/or the several parts thereof, combination and arrangement of such parts, and will be readily understood by those skilled in the art upon reference to the attached drawing in connection with the following specification, wherein the invention is shown, described and claimed.

In the drawing:

Figure 1 is a bottom plan view of a preferred form of slide viewer;

Figure 2 is a longitudinal section taken substantially on the plane of the line 2—2 of Figure 4;

Figure 3 is a transverse vertical section taken substantially on the plane of the line 3—3 of Figure 2;

Figure 4 is a front view of the slide viewer;

Figure 5 is an elevation on a reduced scale, parts being broken away and shown in longitudinal vertical section, showing a modified form of the invention;

Figure 6 is an elevation on a reduced scale of a portion of the slide viewer according to the invention apart from the optical system and showing the mechanism mounted on a suitable base.

In the drawing, wherein like reference characters have been used throughout to designate like parts, 10 designates a light socket of known form which includes means such as the prongs 11 for readily detachably connecting the same to a source of electric current. The end of the socket 10 opposite the prongs 11 is provided with a suitable recess for the reception of any suitable light bulb or source of electric light 12. The forward portion of the socket 10 which provides the mount for the light bulb 12 is of reduced cross-section and preferably cylindrical in form, as at 14, and merges with the rearward portion of the socket 10 to provide a radially outwardly-directed shoulder 13. The rear portion of the socket 10 is preferably provided with any suitable light switch 15.

A substantially cylindrical heat-diffusing housing 16 is provided with a rear inwardly-directed flange 17 which terminates in an axial opening 18 which is complementary to the shape of the neck portion 14 of the socket. A cylindrical side wall of the housing 16 and/or the end flange 17 thereof is formed with a plurality of ventilating openings 19 therein for the rapid dissipation of heat generated by the bulb 12. Thus, the housing 16 is disposed substantially concentrically outwardly of the socket neck 14 and extends forwardly thereof a substantial distance and terminates in straight free edges.

A light housing 20, which is substantially cylindrical in form, is provided at its rear end with a tubular neck 21 which is complementary in cross-section to the cross-section of the neck 14 of the socket and is slidably received thereon. As is clearly seen in Figure 2, the free inner end edges of the neck or collar 21 of the housing 20 abut against the outer surfaces of the flange 17 of the housing 16 and maintain the flange 17 seated against the shoulder 13 of the socket. A forward end portion 22 of the housing 20 is radially outwardly offset to provide a substantially annular shoulder 23. The shoulder 23 provides a seat for a mounting ring 24 for a diffusing glass 25. The outer surface of the offset portion 22 is complementary to the inner surface of the housing 16 and provides a seat for the forward free end of the latter. Forwardly of the offset portion 22, the end portion of the housing 20 is again radially outwardly offset to provide a pair of opposed end flanges 26 and a radially outwardly-directed shoulder 27. The shoulder 27 is preferably substantially rectangular in end view for a purpose to be described later. The rear surface of the flange 27 bears against the free end edges of the housing 16 to cooperate with the free end edges of the collar 21 to maintain the housing 16 seated against the shoulder 13 of the socket.

A preferably substantially rectangular masking plate 31 is complementary to the interior area defined by the flanges 26 and is adapted to be seated on the outer surface of the shoulder 27. As is readily apparent from Figure 2, the rear surface of the masking plate 31 bears against the forward surface of the diffusing glass 25 and maintains the same seated atop the ring 24. One of the flanges 26 of the housing 20 is formed to provide an aperture 30, Figure 6, therethrough, to receive a lug 29 formed on a corresponding side edge of the masking plate 27. Thus, with the lug 29 inserted through the aperture 30 of the flange 26, one edge of the masking plate 31 is locked in place against a corresponding shoulder 27.

A flange 26 opposite to that provided with the aperture 30 is provided with an aperture for the reception of a threaded machine screw or the like 28. The flange 26, which includes the aperture 30, has its free end formed to provide a plurality of inwardly-directed flanges or tongues 32 for a purpose to be described later.

The flanges 26 of the housing 20 are adapted to detachably receive a lens system which may comprise a substantially cylindrical housing 33 provided at its forward end with an eye piece 34 which is detachably secured, as at 36, to such housing. The eye piece 34 also preferably secures to the housing 33 any suitable lens or lens system 35. The rear end of the housing 33 is preferably formed to provide a pair of radially outwardly-offset end flanges 37 which provide rearwardly-directed and radially outwardly-extending shoulders 38. The outer periphery of the flanges 37 are preferably complementary to the inner peripheries of the flanges 26, whereby the former are slidably received in the latter. In this position, Figure 2, the free end edges of the end flanges 37 bear against the outer or forward surface of the masking plate 31 to maintain the same seated against the shoulders 27. The tongues 32 of the end flanges 26 overlie the forward portions of one of the shoulders 38 to maintain the housing seated within the flanges 26 against forward displacement. The opposite flange 37 of the housing 33 is provided with an aperture therethrough which is adapted to align with the corresponding aperture through the corresponding flange 26. An elongated nut 39, Figures 2 and 3, is formed with an interiorly-threaded aperture therethrough which is likewise alignable with the apertures in the flanges 37 and 26, whereby to lock said flanges 37 and 26 together and thereby lock the entire assembly in position on the socket 10. When and if it is desirable to view a photographic slide without magnification or projection, the housing 33 may be removed and the nut 39 applied to lock the masking plate 31 in position. A shoulder 40 of the housing 33 intermediate the flanges 37 thereof is formed to provide a pair of rearwardly-directed tongues or flanges 41 for a purpose to be described. As is apparent in Figure 2, the end flanges 37 of the member 33 position the shoulders 38 and 40 forwardly-spaced relation to the masking plate 31, whereby to provide a vertically-disposed space 42 therebetween which comprises a slideway for the insertion of a photographic slide, not shown, therein. The flanges 41 provide stops to limit the movement of the slide in the slideway, whereby the same is properly positioned in front of the masking opening 43 in the masking plate 31. Such masking plate opening 43 is of any suitable shape, but is preferably cruciform, whereby to successfully disclose a rectangular slide wherein the picture portion thereof is longer in one dimension than in the other. That is to say, such a slide may be successfully viewed irrespective of whether the same is inserted in the slideway right side up or sidewise. As is readily apparent from Figures 3, 4 and 6, at least one of the upper corners of each of the shoulders 38 of the housing 33, at least one of the upper corners of the masking plate 31, and at least one of the upper corners of the shoulders 27 is cut away, as at 44, 45 and 46, respectively, whereby to expose the corresponding corner or corners of a photographic slide, not shown, inserted in the slideway 42. With one or both of such upper corners cut away, an operator of the viewer may readily grasp the corners of the photographic slide to remove the same from the slideway.

To assemble the device so far described, the socket 10 is loaded with a suitable light bulb 12 and the heat-diffusing housing 16 is slipped over the neck 14 of the socket. The light housing 20 is then also slipped over the neck 14 to bear against the outer surface of the flange 17. Thereafter, the ring 24 is seated against the shoulder 23 of the light housing and the diffusing glass 25 is applied atop the ring 24. The masking plate 31 may now be applied by inserting the lug 29 thereof through the opening 30 in the flange 26 and swinging the opposite side edge of the masking plate against the outer surface of the shoulder 27. If the housing 33 is not to be used, the nut 39 is now applied and threaded into place by the screw 28. This arrangement locks the opposite edge of the masking plate 31 against the opposite shoulder 27 and maintains the parts in assembled relation. If the housing 33 or the like is to be used, one of the flanges 37 and shoulders 38 are inserted beneath the lugs 32 of the flange 26, and the opposite flange 37 is seated against the outer surface of the masking plate 31. The nut 39 is now applied and screwed into place. In this connection, it is well to mention that by providing an elongated nut, such as is shown in Figure 3, the same may be dropped down the slideway 42 and maneuvered by fingers at the opposite ends of the flange 37 to properly position the aperture of the nut in alignment with the aperture for the screw 28.

In the use of the device as hereinbefore described, a suitable photographic slide, not shown, is inserted in the slideway 42 on top of the lugs 41. The light is now turned on and the user of the viewer by looking through the lens 35 in a well-known manner sees an enlarged illuminated view of the photographic scene carried by the slide. To a limited extent, this form of the invention may be used as a projector, whereby the image of the photographic slide is projected through the lens 35 onto a suitable screen, not shown. As this form of the invention provides no means for focusing the lens 35, it is necessary to move the viewer as a whole backwards or forward relative to the screen to achieve a proper focus.

In the form of the invention disclosed in Figure 5, the structure of the socket 10, heat-diffusing housing 16 and eye piece 34 is substantially identical to the corresponding parts previously described. However, the rear end of the housing 133 and/or the forward end of the light housing 20 are suitably modified to provide therebetween a suitable elongated housing 52 which is formed with an interior channel 53 to receive any suitable photographic slide carrier, not shown. Also, such housing 52 is preferably pivoted on suitable trunnions 54 to the upper free ends of the legs of a yoke member 51 which is supported pivotally, as at 55, atop a suitable base 50. In this form of the invention, it is obvious that the pivotal joint 55, together with the trunnions 54, provide a universal mount for the viewer, whereby the same may be turned in any direction to permit successive viewing by a plurality of people seated around the base 50, and/or to project the slide onto a suitable screen.

In the form of the invention disclosed by Figure 6, a suitable base 56 is provided and is connected, as by the wire 57, to a suitable source of electric current. The base 56 is preferably formed with a forwardly-inclined face 58 which includes a convenience outlet for electricity from the wire 57. The convenience outlet, not shown, is adapted to receive the prongs 11 of the socket 10 in a well known manner. In this form of the invention, the base 56 is preferably seated on a table with the forward face 58 facing the user of the viewer, whereby the eye piece 34 and housing 33, not shown, extend forwardly at an angle convenient for the viewing of slides.

While I have shown and described what is now thought to be the preferred embodiment of the invention, it is to be understood that the same is susceptible of other forms and expressions. Consequently, I do not limit myself to the precise structure shown and described hereinabove except as hereinafter claimed.

I claim:

1. In a photographic slide viewer, the combination with an electric light socket, a diffusing glass, a masking plate, and a viewing lens housing; of a hollow and substantially cylindrical light housing, means mounting said light-housing concentrically on said socket with the forward end of said light-housing extending forwardly thereof, a forward end portion of said light-housing being radially outwardly-offset to provide an annular shoulder adapted to seat said diffusing glass, a further forward end portion of said light-housing being radially outwardly offset to provide a substantially rectangular shoulder and end flange adapted to receive said masking plate, said end flange being formed to provide an aperture therethrough, said masking plate being formed with a laterally-directed lug insertable through said aperture to secure one side of said masking plate against said second shoulder, said end flange including means for mounting said viewing lens housing therein in outwardly-spaced relation to said masking plate to provide a slideway therebetween, and detachable means carried by said light-housing for securing an opposite side of said plate and said viewing lens housing to said end flange.

2. In a photographic slide viewer, the combination with an electric light socket, a diffusing glass, and a masking plate; of a hollow and substantially cylindrical light housing, means mounting said light-housing concentrically on said socket with the forward end of said light-housing extending forwardly thereof, a forward end portion of said light-housing being formed to provide means mounting said diffusing glass and said masking plate in superposed relation on a forward end portion of said light housing, a heat-diffusing housing surrounding said light housing, said heat diffusing housing including a front edge and a radially inwardly directed annular rear flange, and said light housing including a rear edge seating on said flange of said heat diffusing housing and a radially outwardly directed shoulder bearing on said front edge of said heat diffusing housing, whereby to mount the latter on said socket against axial movement relative to said light housing and said socket.

3. In a photographic slide viewer, the combination with an electric light socket, a diffusing glass, a masking plate, and a viewing lens housing; of a hollow and substantially cylindrical light-housing, means mounting said housing concentrically on said socket with the forward end of said light-housing extending forwardly thereof, a forward end portion of said light-housing being radially outwardly offset to provide an annular shoulder adapted to seat said diffusing glass, a further forward end portion of said light-housing being radially outwardly offset to provide a substantially rectangular shoulder and end flange adapted to receive said masking plate, said end flange being formed to provide an aperture therethrough, said masking plate being formed with a laterally-directed lug insertable through said aperture to secure one side of said masking plate against said second shoulder, said end flange including means for mounting said viewing lens housing therein in outwardly-spaced relation to said masking plate to provide a slideway therebetween, detachable means carried by said light-housing for securing an opposite side of said plate and said viewing lens housing to said end flange, said viewing lens housing including a substantially rectangular base coextensive with said rectangular shoulder, said masking plate being substantially rectangular and coextensive with said rectangular flange, and adjacent corners of said rectangular shoulder, masking plate and base of said viewing housing being cut away and adapted to expose at least one corner of a photographic slide seated in said slideway.

4. In a photographic slide viewer, an electric light socket having a cylindrical mount for the reception of a light bulb, a heat diffusing housing having one end circumposed about said mount and slidably supported thereon, a hollow light housing disposed within said heat diffusing housing and having one end slidably supported on said mount and abutting said one end of said heat diffusing housing, the other end of said light housing being bent outwardly to overlie and abut the other end of said heat diffusing housing, a diffusing glass supported within said light housing adjacent to said other end thereof, a pair of opposed end flanges extending from said other end of said light housing, a masking plate positioned in alignment with said diffusing plate and supported between said opposed end flanges, a lens housing including a viewing lens arranged in alignment with said masking plate and spaced therefrom, and securing means extending through one of said end flanges and said lens housing for securing the latter to said light housing.

5. In a photographic slide viewer, an electric light socket having a cylindrical mount for the reception of a light bulb, a heat diffusing housing having one end circumposed about said mount and slidably supported thereon, a hollow light housing disposed within said heat diffusing housing and having one end slidably supported on said mount and abutting said one end of said heat diffusing housing, the other end of said light housing being bent outwardly to overlie and abut the other end of said heat diffusing housing, a diffusing glass supported within said light housing adjacent to said other end thereof, a pair of opposed end flanges extending from said other end of said light housing, a masking plate positioned in alignment with said diffusing plate and supported between said opposed end flanges, and lens means positioned in spaced alignment with said masking plate and supported between said opposed flanges for viewing slides disposed in the space intermediate said masking plate and said lens means.

PERLEY A. SHERWOOD.

REFERENCES CITED

The following references are of record in the file of this patent:

UNITED STATES PATENTS

| Number | Name | Date |
| --- | --- | --- |
| 1,808,176 | Pieper et al. | June 2, 1931 |
| 2,349,013 | Sparling | May 16, 1944 |
| 2,364,730 | Leskin | Dec. 12, 1944 |